Patented Oct. 31, 1950

2,528,162

UNITED STATES PATENT OFFICE 2,528,162

N-DIMETHYLAMINOETHYLACRIDAN AND ITS ACID ADDITION SALTS

Jack Mills, Indianapolis, Ind., assignor to Eli Lilly and Company, Indianapolis, Ind., a corporation of Indiana No Drawing. Application February 18, 1948, Serial No. 9,316

4 Claims. (Cl. 260—279)

This invention relates to a N-dimethylaminoethylacridan and acid addition salts thereof.

N-dimethylaminoethylacridan may be represented by the following formula

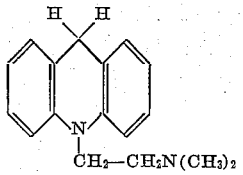

N-dimethylaminaethylacridan is a low-melting, slightly yellow, waxy solid. Because of the presence of the basic side chain it forms salts with acids. Salts formed from the common mineral acids are in general water-soluble. Salts formed from organic acids, especially acids of higher molecular weight, exhibit oil solubility. N-dimethylaminoethylacridan and its acid addition salts have utility as antihistaminic agents.

The compounds of the present invention may be prepared by reacting an alkali-metal salt of dihydroacridine with a dimethylaminoethyl halide in a suitable solvent. Conveniently, the alkali metal salt of dihydroacridine is prepared by treating the dihydroacridine with a suspension of an alkali-metal amide, for example, sodamide, potassamide or lithium amide, in a solvent for the dihydromethylacridine. The metal salt is not isolated from the reaction mixture but is treated directly with the dimethyl aminoethyl halide. The solvent used may be any desired inert solvent in which the reactants are mutually soluble, for example, toluene, xylene, benzene, and the like.

The resulting N-dimethylaminoethylacridan may readily be isolated and purified by methods known to the art, such as by treatment of the reaction mixture with water, extraction of the desired acridan with a suitable solvent and evaporation of the solvent. The acridan may be purified by vacuum distillation or by recrystallization from a solvent.

The acid addition salts of the novel compound may be prepared by the methods commonly used to prepare acid addition salts of nitrogenous organic bases. For example, the base may be dissolved in a solvent containing the theoretically required amount of the desired acid, followed by evaporation of the solvent, or precipitation of the salt therefrom by the addition of a solvent in which the salt is insoluble.

The following examples more specifically illustrate the preparation of N-dimethylaminoethylacridan and its acid addition salts.

EXAMPLE 1

*Preparation of N-dimethylaminoethylacridan*

To a suspension of 214 g. (5.5 mols) of freshly prepared sodamide in 6 liters of toluene are added 905 g. (5 mols) of acridan. The mixture is refluxed 10 hours and then cooled to 50° C., and 665 g. (6.15 mols) of dimethylaminoethyl chloride are added slowly, while keeping the reaction mixture at a temperature below 75° C. by the application of cooling means. After addition of the dimethylaminoethyl chloride the reaction mixture is maintained at 75° C. for 12 hours and is then heated to refluxing temperature for about 1 hour. The reaction mixture is cooled, is washed with 2 liters of water, and the organic toluene layer is evaporated to dryness in vacuo yielding an oily residue which comprises chiefly N-dimethylaminoethylacridan. The substituted acridan is purified by recrystallizing it from ether.

N-dimethylaminoethylacridan thus prepared melted at about 51-52° C. 950 g. of light yellow crystals were obtained, which on analysis showed the presence of about 10.70 percent nitrogen as compared with the calculated value of 11.11 percent nitrogen.

EXAMPLE 2

*Preparation of N-dimethylaminoethylacridan hydrochloride*

A solution of 500 g. of N-dimethylaminoethylacridan in 1000 cc. of ethanol is cooled and treated with a solution of 71 g. of hydrogen chloride in 750 cc. of ethanol. Ether is then added until crystallization of the N-dimethylaminoethylacridan is complete. The N-dimethylaminoethylacridan hydrochloride is filtered off, washed with ether and recrystallized from concentrated alcohol solution by addition of ether.

N - dimethylaminoethylacridan hydrochloride melts at about 206-207° C. N-dimethylaminoethylacridan hydrochloride upon analysis showed the presence of 9.84 percent nitrogen as compared with the calculated value of 9.72 percent nitrogen.

I claim:
1. A compound of the group consisting of N-dimethylaminoethylacridan and its acid addition salts.
2. N-dimethylaminoethylacridan.
3. Acid addition salts of N-dimethylaminoethylacridan.
4. N-dimethylaminoethylacrodan hydrochloride.

JACK MILLS.

REFERENCES CITED

The following references are of record in the file of this patent:

Eisleb: Berichte, vol. 74-B, pp. 1433-1450 (1941).

Wiselogle: "Survey of Antimalarial Drugs, 1941-1945," vol. II, part I, p. 666. (J. W. Edwards; Ann Arbor, Mich., 1946).